(12) United States Patent
Pandey et al.

(10) Patent No.: US 6,934,205 B1
(45) Date of Patent: Aug. 23, 2005

(54) BIST FOR PARALLEL TESTING OF ON CHIP MEMORY

(75) Inventors: Pramod Pandey, Pasir RIs (SG); Ali Najafi, Campbell, CA (US)

(73) Assignee: Infineon Technologies Aktiengesellschaft, Munich (DE)

( * ) Notice: Subject to any disclaimer, the term of this patent is extended or adjusted under 35 U.S.C. 154(b) by 0 days.

(21) Appl. No.: 10/363,189

(22) PCT Filed: Sep. 6, 2000

(86) PCT No.: PCT/SG00/00132

§ 371 (c)(1),
(2), (4) Date: Jul. 28, 2003

(87) PCT Pub. No.: WO02/21234

PCT Pub. Date: Mar. 14, 2002

(51) Int. Cl.[7] .............................................. G11C 7/00
(52) U.S. Cl. ...................................... 365/201; 365/200
(58) Field of Search ................................ 365/201, 200; 714/710, 711

(56) References Cited

U.S. PATENT DOCUMENTS

| | | | |
|---|---|---|---|
| 4,193,125 A | 3/1980 | Moriya | 365/104 |
| 4,639,892 A | 1/1987 | Mizugaki et al. | 365/182 |
| 5,293,386 A | 3/1994 | Muhmenthaler et al. | 371/21.1 |
| 5,394,354 A | 2/1995 | Watabe et al. | 365/51 |
| 5,414,653 A | 5/1995 | Onishi et al. | 365/145 |
| 5,535,164 A | 7/1996 | Adams et al. | 365/201 |
| 5,541,872 A | 7/1996 | Lowrey et al. | 365/145 |
| 5,617,531 A | 4/1997 | Crouch et al. | 395/183.06 |
| 5,764,588 A | 6/1998 | Nogami et al. | 365/230.05 |
| 5,805,789 A | 9/1998 | Huott et al. | 395/182.05 |
| 5,856,940 A | 1/1999 | Rao | 365/149 |
| 5,963,468 A | 10/1999 | Rao | 365/149 |
| 6,067,265 A | 5/2000 | Mukunoki et al. | 365/210 |
| 6,072,737 A * | 6/2000 | Morgan et al. | 365/201 |
| 6,085,334 A * | 7/2000 | Giles et al. | 714/7 |
| 6,091,649 A | 7/2000 | Choi | 365/200 |
| 6,108,252 A | 8/2000 | Park | 365/201 |
| 6,147,895 A | 11/2000 | Kamp | 365/145 |
| 6,421,283 B1 * | 7/2002 | Walley et al. | 365/200 |
| 6,421,797 B1 | 7/2002 | Kim | 714/718 |
| 6,427,283 B1 * | 8/2002 | Dietrich et al. | 15/250.32 |
| 6,523,135 B1 | 2/2003 | Nakamura | 714/30 |
| 2002/0194558 A1 | 12/2002 | Wang et al. | 714/718 |

OTHER PUBLICATIONS

Daisaburo Takashima, IWAO Kunishima: "High–Density Chain Ferroelectric Random Access Memory (Chain FRAM)": IEEE Journal of Solid–State Circuits, vol. 33, No. 5; May 1998; pp. 787–792.

* cited by examiner

*Primary Examiner*—Anh Phung
(74) *Attorney, Agent, or Firm*—Horizon IP Pte Ltd

(57) ABSTRACT

A processor assisted memory BIST to identify detective memory addresses. The processor generates the address to be tested and the BIST generates the test data used to test the memory. Data is written to an read from memory. The read data is compared with the test data. If a mismatch occurs, the BIST generates an interrupt to identify the processor. Since the processor generated the address, the defective memory address is identified. The defective memory address can subsequently be replaced with redundant memory cells.

24 Claims, 5 Drawing Sheets

BIST FOR PARALLEL TESTING OF ON CHIP MEMORY

FIELD OF THE INVENTION

The present invention relates generally to testing of memory. More particularly, the invention relates to internal testing of an integrated circuit's on chip memory.

BACKGROUND OF THE INVENTION

Integrated circuits (ICs) generally include various modules combined to perform various functions. For example, a digital signal processor (DSP) may include processor and memory modules. The modules are tested for defects, ensuring the operability of the IC. To test the modules, special test circuits, referred to as "Built-In Self Test" (BIST) circuits are incorporated into the IC.

An area of interest is the testing of the on-chip memory module. The memory module is tested by a memory BIST to determine whether the memory module is defective or not. In some cases, if the number of defective memory cells is relatively low, the IC may still be salvaged using redundant cells. However, most conventional memory BISTs only identify whether any defects exist in memory module, not the location or number of defects in the memory module. Without knowing the defective addresses, they can not be repaired with redundant cells. Furthermore, the testing of memory requires extensive amount of time, particularly with larger memories.

As evidenced from the above discussion, it is desirable to provide a memory BIST capable of testing memory faster and identifying defective locations.

SUMMARY OF THE INVENTION

The invention relates generally to integrated circuits. More particularly, the invention relates to an integrated circuit comprising a memory BIST for testing of memory modules. In accordance with the invention, the memory BIST cooperates with the processor to test one or more memory modules. The use of a processor assisted memory BIST enables defective memory locations or addresses to be identified. In one embodiment, the processor generates addressing information while the memory BIST generates test and expected data patterns. The test patterns are written into memory locations of the memory modules. A memory location is read. The data read is compared with an expected data pattern from the memory BIST. If the data read and expected data pattern do not match, an interrupt is generated. Since the processor generated the address, the defective memory location can be identified.

PREFERRED EMBODIMENTS OF THE INVENTION

Figure 1:
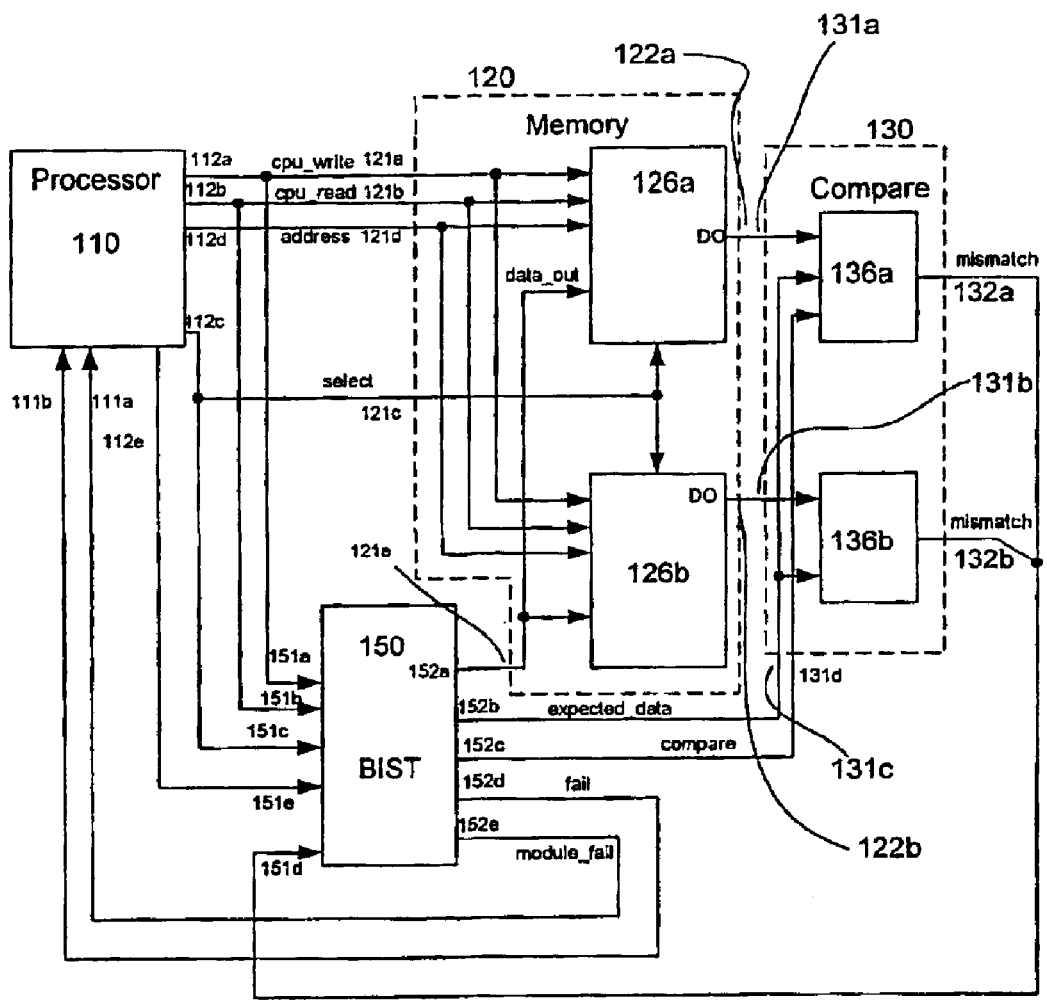
FIG. 1 shows a portion of an IC in accordance with one embodiment of the invention.

FIG. 1 shows a portion of an IC 100 for testing on-chip memory in accordance with one embodiment of the invention. The portion of the IC includes a processor (CPU) 110, a memory BIST 150, a memory block 120, and a compare block 130. Testing of the memory block comprises writing a test pattern to a memory location and then reading it back from that location. A match between the read and write data patterns indicates a valid memory location; a mismatch indicates a fault.

The processor comprises output terminals 112a–c (cpu_write, cpu_read, and select signals) coupled to input terminals 121a–c of the memory block and input terminals 151a–c of the BIST. Additionally, the processor includes an output terminal 112d (address signal) coupled to the input terminal 121d of the memory block and an output terminal 112e (mode signal) coupled to input terminal 151e of the BIST. The BIST includes output terminals 152a–d (data_out, expected_data, compare, and fail signals). Output terminal 152a is coupled to an input terminal 121e of the memory block; output terminals 152b–c are coupled to the compare block (input terminals 131c–d) while output terminal 152d is coupled to an input terminal 111b (interrupt) of the processor.

As shown, first and second memory modules 126a–b are provided in the memory block. The memory block may also be provided with more or less memory modules. In one embodiment, the BIST includes an output terminal 152e (module-fail) to identify which memory module or modules are defective. The output terminal 152e is coupled to an input terminal 111a of the processor.

The compare block comprises a comparator which is used to compare the read and write data patterns. To test the memory modules in parallel, a comparator is assoicated with each memory modules. A first comparator 136a comprises an input terminal 131a coupled to an output terminal 122a (DO signal) of the first memory module. Similarly, an input terminal 131b of a second comparator 136b is coupled to an output terminal 122b of the second memory module.

To test memory, the processor generates the appropriate signals to the BIST and memory block. In particular, the processor generates cpu_write, mode, address, and select signals to write a test pattern to memory. The BIST module receives the cpu_write, mode, and select signals from the processor. The select signal activates the BIST module. The mode signal sets the BIST to a specific test mode. Using the mode signal, the BIST can be programmed for different test modes. The cpu_write signal informs the BIST that a write operation is being performed. In response to the signals, the BIST generates a test pattern (data out signal) to the memory block. The test pattern generated by the BIST depends on the BIST mode.

The memory block receives the cpu_write, address, and select signals from the processor and the data_out signal from the BIST. The memory block decodes the address, selecting the appropriate memory location. The cpu_write signal activates the memory's write circuitry to write the test pattern to the selected memory location. In one embodiment, the test pattern is written to all memory modules in parallel.

To read from memory, the processor generates cpu_read, mode, address, and select signals. The cpu_read, address, and select signals cause the memory module to output the data (DO signal) stored in the memory location designated by the address. The BIST module receives the cpu_read, mode, and select signals from the processor. In response to the input signals, the BIST mode generates an active compare signal and the data pattern (expected_data signal) that was written to memory.

The active compare signal instructs the comparators to compare the DO signal from the memory modules with the expected_data signal. If the DO and expected_data signals do not match, an active mismatch signal is generated by the comparator. The active mismatch signal causes the BIST to generate an active fail signal to interrupt the processor. A module_fail signal is also generated by the BIST to indicate which module contains the defective address.

Upon receiving an active fail signal, the processor executes an interrupt service routine. With information provided by the BIST and the address generated by the processor, the defective address or addresses can be identified. The defective addresses are stored in, for example, a file which can be used to implement redundancy to repair the defective addresses.

Figure 2:
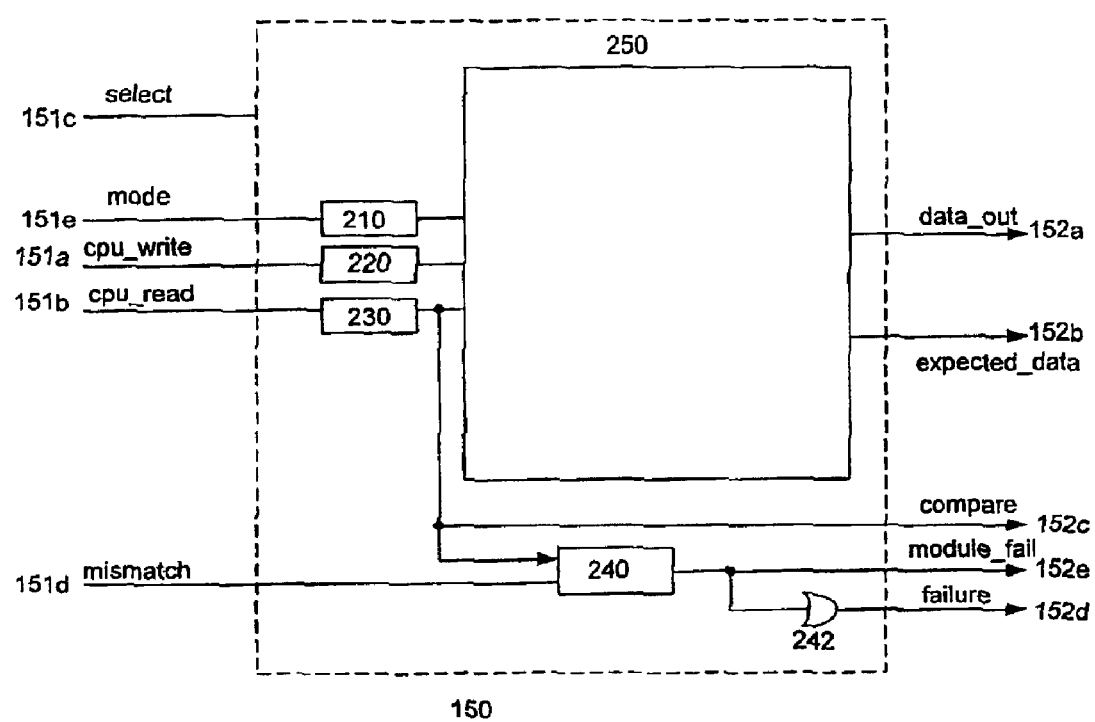
FIG. 2 shows a BIST in accordance with one embodiment of the invention.

FIG. 2 shows a BIST 150 in accordance with one embodiment of the invention. As shown, the BIST comprises a mode register 210, write and read detect circuits 220 and 230, a pattern generator 250, and a result register 240. An input terminal 151e (mode signal) is coupled to the mode register. The processor writes to the mode register to set the BIST to a specific test mode. The write and read detect circuits monitor the processor via input terminals 151a–b (cpu_write and cpu_read signals). When the processor is writing to memory, the write detect circuit generates an active signal at its output 221. The read detect circuit generates an active signal at its output 231 during a read operation.

The output signals of the mode register and the read and write detect circuits are coupled to the pattern generator. Based on the output signals, the pattern generator generates an expected_data signal at output terminal 152b and a data_out signal at output terminal 152a. The data_out signal contains the test pattern which is written to memory and the expected_data signal contains the pattern which was written to memory.

The output of the read detect circuit is also coupled to the result register and serves as the compare signal. The active output signal (read operation) from the read detect circuit activates the compare circuit, causing the comparator therein to compare the data read from memory (DO) with the expected_data signal. If both DO and expected_data are the same (match), the memory location is good and in an active mismatch signal is generated. However, if both the DO and expected_data are not the same (mismatch), the memory location is defective. This causes an active mismatch signal to be generated by the comparator.

The active output signal from the read detect circuit also activates the result register 240. An input terminal of the result register is coupled to the output of the compare circuit. An active mismatch signal from the compare circuit causes the result register to generate an active fail signal to interrupt the processor. In one embodiment, the active mismatch signal comprises a logic 1 signal.

For a memory block with more than one memory module, a comparator can be associated with each module to facilitate parallel testing. The output signals of the comparators are stored in the result register (e.g., one bit per module). An OR gate 242 receives the mismatch signals stored in the result register. An active mismatch signal (logic 1) from any of the comparators results in an active fail signal (logic 1) to be generated at the output of the OR gate to be generated to interrupt the processor. Each bit of the result register also serves as the module_fail signal, enabling the processor to identify the defective module or modules.

Figure 3:
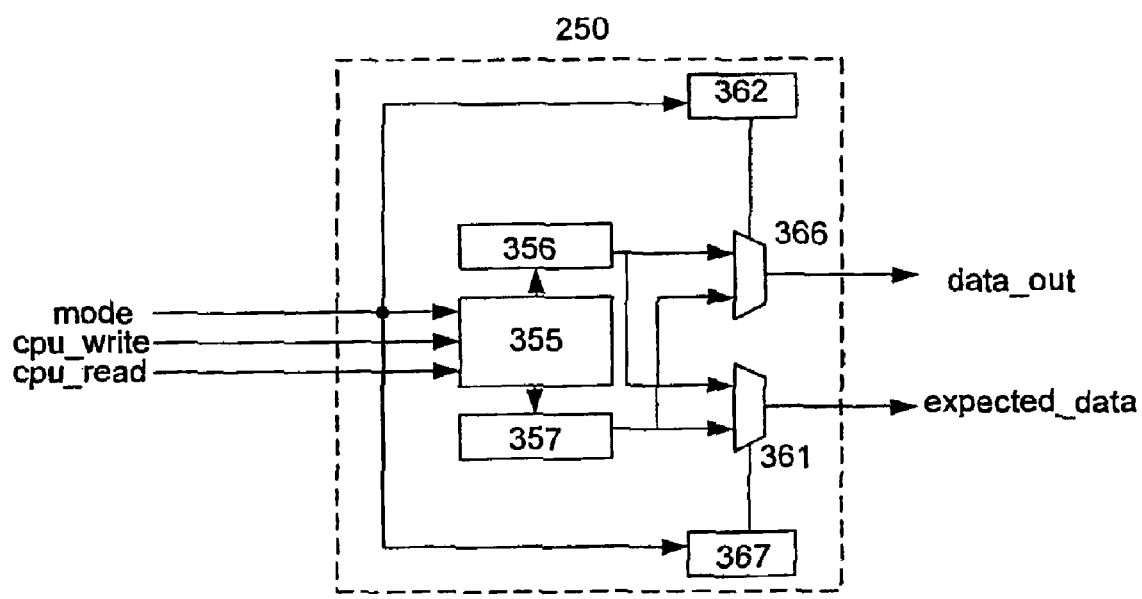
FIG. 3 shows a pattern generator in accordance with one embodiment of the invention.

FIG. 3 shows a pattern generator 250 in accordance with one embodiment of the invention. The pattern generator 250 comprises first and second pattern registers 356 and 357. The registers, for example, are one byte in length (8 bits) and are used to store test patterns. In one embodiment, the first register stores a predefined test pattern (e.g., 00 or FF hex); the second pattern register is accessible by the processor to store a test pattern (e.g., AA or 55 hex) defined by the test routine.

A pattern modification circuit 355 coupled to the first and second pattern registers is provided. The pattern modification circuit generates a command to change the contents of the pattern registers. In one embodiment, the pattern modification circuit generates commands to invert the contents of the first and/or second pattern registers. The commands are issued in response to the input signals from the mode register and the read and write detect circuits. That is, depending on the BIST mode and whether the processor is performing a read or a write operation, the pattern modification circuit determines which pattern register to instruct to invert its contents. The ability to change the contents of the pattern registers increases the test capabilities of the BIST.

The pattern registers are coupled to data out and expected data multiplexers 361 and 366. The data out multiplexer comprises an output terminal (expected_data signal) coupled to memory and the expected data multiplexer's output terminal (data_out signal) is coupled to the compare block. The select circuits 362 and 367 determine the origin (first or second pattern register) of the data_out and expected data signals based on the BIST mode.

In one embodiment, the BIST comprises four modes. Table 1 shows the source of the data_out and expected data signals in accordance with the different BIST modes.

TABLE 1

| Mode | Data_out | Expected_data |
| --- | --- | --- |
| 00 | Second pattern register | Don't care |
| 01 | First pattern register | Second pattern register |
| 10 | Second pattern register | First pattern register |
| 11 | Don't care | Second pattern register |

Figure 4:
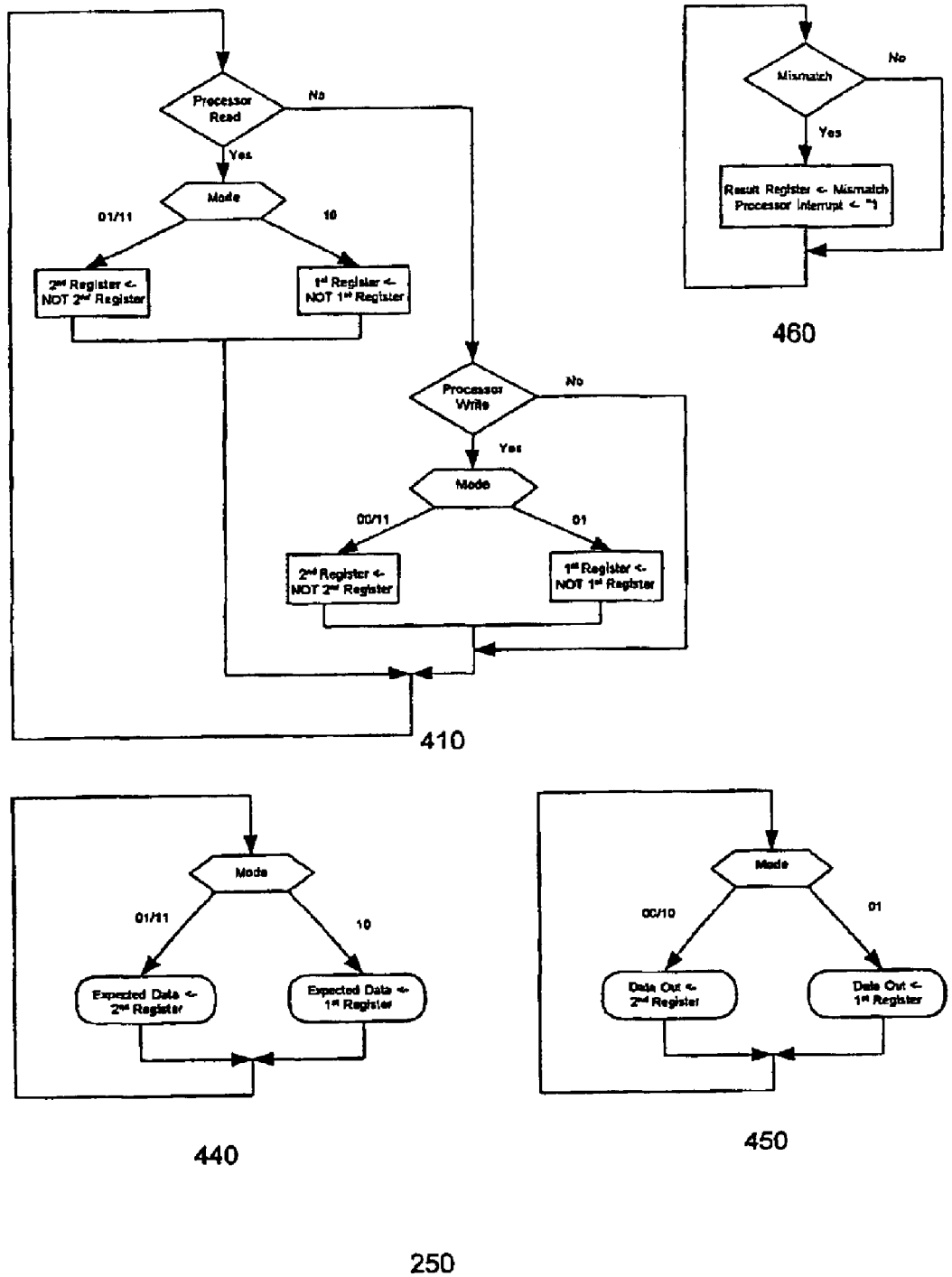
FIG. 4 shows an algorithmic state machine of the BIST in accordance with one embodiment of the invention.

FIG. 4 represents an algorithmic state machine of the pattern generator 250. In one embodiment, the assignments depicted in rectangular blocks occur at the rising edge of the clock (e.g., sequential logic) and the assignments in the ovals occur immediately (e.g., combinational logic). The pattern modification and the pattern registers are depicted by flow diagram 410. The data pattern in the pattern registers depends on the operation that the processor is performing and the BIST mode.

The pattern generator determines the type of memory access that the processor is performing. If the processor is performing a read (411), the pattern generator proceeds to determine the BIST test mode (412). The content of the second register (processor writable register) is inverted in BIST mode 00 or 10 (413). In BIST mode 10, the pattern generator inverts the content of the first pattern register (414). If, on the other hand, the processor is performing a write operation (415), the pattern generator inverts the data stored in the second pattern register in BIST mode 00 or 11 (417). In BIST mode 01, the data in the first pattern register is inverted (418).

The expected data select circuit and expected data multiplexer are represented by flow diagram 430. If the BIST mode is 01 or 11 (431), the expected data select circuit causes the expected data mulitplexer to select the contents of the second pattern register (432). On the other hand, in mode 10, the contents of the first pattern register are selected (433).

Referring to flow diagram 440, the data out select circuit and data out multiplexer are shown. If the BIST mode is 00 or 01 (441), the data out select circuit causes the data out mulitplexer to select the contents of the second pattern register (442). The contents of the first pattern register are selected if the BIST mode is 01 (state 443).

The result register is depicted by flow diagram 460. If an active mismatch signal is detected (461), the result register generates an active fail signal which interrupts the processor (462). Otherwise, the fail signal remains inactive. In one embodiment, the result register comprises a bit for each memory module. Each bit of the register can be provided to the processor to identify the defective memory module.

Figure 5:
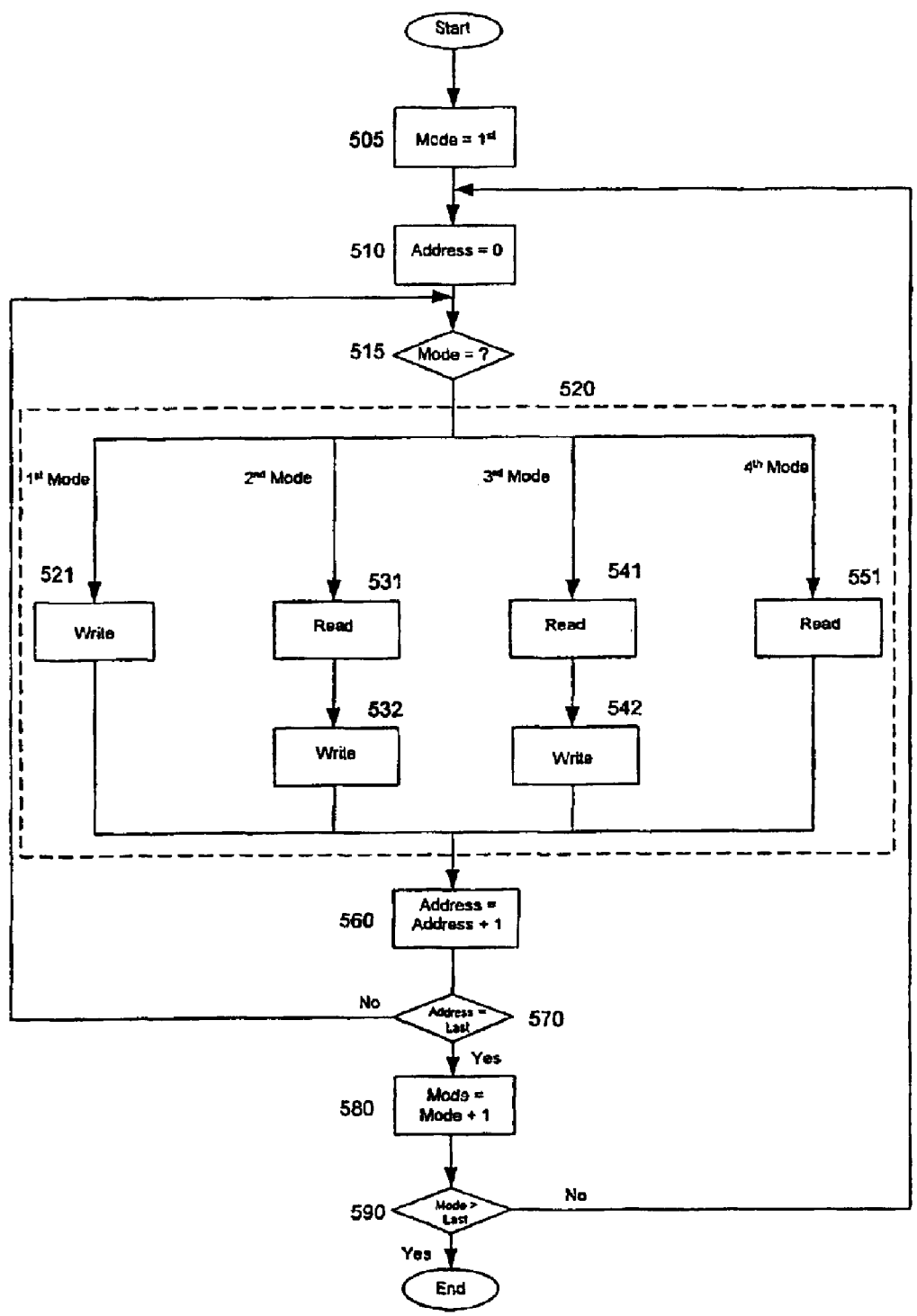
FIG. 5 shows a flow chart of a test routine in accordance with one embodiment of the invention.

FIG. 5 shows a flow diagram of a memory test routine in accordance with one embodiment of the invention. The test routine is executed by the processor with BIST assistance during read and write operations. At steps 505 and 510, the routine initializes the IC by setting the BIST to the first mode (mode register=00) and address pointer to 0 (first memory location). At step 515, the routine determines the test mode at step 515 to execute at step 520. In one embodiment, four test modes are provided. The routine loops from steps 515 to 570 until the test mode is finished. In one embodiment, a test mode is completed after accessing all memory locations. For memory blocks comprising a plurality of memory modules, all or some of the memory modules can be tested simultaneously. After completing a test mode, the processor increments the mode register at step 580. The routine loops from steps 510 to step 590 until all test modes have been executed.

The first test mode comprises writing a test pattern to memory at step 521. At step 560, the address pointer is incremented to point to the next address location. At step 570, the routine loops back to step 515 to write a test pattern to the next address location. The routine repeats steps 515 to 570 until all locations have been written with a test pattern.

In one embodiment, the test pattern or data out is provided in accordance with table 1. In the first mode (mode register=00), the test pattern is from the second pattern generator. With each write operation, the pattern modification circuit inverts the contents of the second pattern register. As such, a first data pattern (e.g., 55 hex or 01010101) is written to every other address location while the alternate address locations are written with a second data pattern (e.g., AA hex or 10101010).

The first mode is completed after all locations have been written to with a test pattern. The address pointer is reset after a test mode is completed to prepare for the next test mode.

The second test mode (mode register=01) comprises reading from memory the test pattern written in the first test mode at step 531. At step 532, a new test pattern is written to memory. Steps 531 and 532 are repeated until all memory locations have been tested and written with a new test pattern.

During the read operation, the read detect circuit generates an active signal. The active signal activates the comparator to compare the data read from memory (DO) with the expected data. In one embodiment, the expected data is generated by the pattern generator in accordance with table 1. In the second test mode, the expected data is provided by the second pattern register. If the DO and the expected data do not match, the comparator informs the BIST to generate an interrupt signal. The active signal from the read detect circuit also causes the contents of the second pattern register to be inverted. The inverted data pattern is used as the expected data to test the next memory location.

The contents of the mode register causes the pattern generator to provide the test pattern (data out) from the first pattern register. In one embodiment, the pattern register comprises 00 hex. Other data patterns are also useful. When the processor is performing the write operation, the write detect circuit generates an active signal, causing the pattern register to invert its contents to serve as the test pattern for the next memory address. After completion of the second test mode, every other address location would contain 00 hex while the alternate locations would contain FF hex.

The third test mode (mode register=10) comprises testing memory by performing a read at step 541. The data read from memory (DO) is compared with the expected data provided by the first pattern register. The read operation also inverts the content of the first pattern register to serve as the expected data for the next memory location. At step 542, a new test pattern is written to memory. The test pattern is provided by the second pattern register. In one embodiment, the initial test pattern in the second pattern register is inverted. For example, the original data pattern of 55 is inverted to AA. The write causes the second pattern register to invert its content to serve as the test pattern for the next memory address location. After all memory locations have been tested and written with a new test pattern, the routine proceeds to the forth test mode. At the end of the third test mode, every other address location in memory contains AA while the alternate locations contain 55.

In the forth test mode (mode register=11), the routine reads from memory at step 551. The data read from memory is compared with the expected data from the second pattern register. The content of the second pattern register is then inverted for use as the expected data for the next address location. The forth test mode is completed after all addresses have been read.

The following is a pseudo code representation of the test routine in accordance with one embodiment of the invention.

```
/* Mode 1*/
Set the memory BIST to mode 00
    Loop for current __address from 0 to maximum
address in steps of 2
        Write 01010101 to current __address
        Write 10101010 to (current__address+1)
End loop
/* Mode 2 */
Set the memory BIST to mode 01
    Loop for current__address from 0 to maxium
address in steps of 2
        Read current__address and expect 01010101
        Write 00000000 to current__address
        Read (current__address+1) and expect 10101010
        Write 11111111 to (current__address+1)
End loop
/* Mode 3 */
Set the memory BIST to mode 10
    Loop for current__address from 0 to maximum
address in steps of 2
        Read current__address and expect 00000000
        Write 10101010 to current__address
        Read (current__address+1) and expect 1111111
        Write 01010101 to (current__address+1)
End loop
/* Mode 4 */
```

-continued

```
Set the memory BIST to mode 11
    Loop for current_address from 0 to maximum
    address in steps of 2
        Read current_address and expect 10101010
        Read (current address+1) and expect 01010101
    End loop
```

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. In an integrated circuit including processor, memory and built-in-self-test modules, a method for testing the memory module comprising:
    generating an address by the processor module;
    providing a test data pattern by the BIST module;
    writing the test data pattern into a location in the memory module corresponding to the address;
    reading a stored data pattern from the location; and
    comparing the stored data pattern with the test data pattern; and
    interrupting the processor if the data pattern and the test pattern are not equal, wherein the address generated by the processor module corresponds to a defective location in the memory module.

2. An IC comprising:
    a processor, a BIST, and a memory module which are interconnected to each other;
    at least a first operating mode wherein the BIST is disabled; and
    a test mode in which the processor generates addressing information and the BIST generates data information for testing the memory module, wherein the cooperation between the processor and BIST module enables the identification of defective memory locations in the memory module.

3. The method of claim 1 wherein the processor in test mode comprises providing mode information for programming the BIST to operate in a selected one of a plurality of test modes.

4. The method of claim 3 wherein providing a test data pattern by the BIST comprises:
    the processor providing the BIST with a test pattern;
    storing a predefined test pattern in the BIST; and
    modifying the test pattern or predefined test pattern to provide the test data pattern.

5. The method of claim 4 wherein modifying the test pattern or predefined test pattern comprises inverting the test pattern of predefined test pattern.

6. The method of claim 5 wherein modifying the test pattern or predefined test pattern depends on whether the processor is reading or writing to the memory module and the selected test mode of the BIST.

7. The method of claim 4 wherein modifying the test pattern or predefined test pattern depends on whether the processor is reading or writing to the memory module and the selected test mode of the BIST.

8. The method of claim 3 comprises testing a plurality memory modules in parallel.

9. The method of claim 8 wherein the processor in test mode comprises providing mode information for programming the BIST to operate in a selected one of a plurality of test modes.

10. The method of claim 9 wherein providing a test data pattern by the BIST comprises:
    the processor providing the BIST with a test pattern;
    storing a predefined test pattern in the BIST; and
    modifying the test pattern or predefined test pattern to provide the test data pattern.

11. The method of claim 10 wherein modifying the test pattern or predefined test pattern comprises inverting the test pattern of predefined test pattern.

12. The method of claim 11 wherein modifying the test pattern or predefined test pattern depends on whether the processor is reading or writing to the memory module and the seleted test mode of the BIST.

13. The method of claim 10 wherein modifying the test pattern or predefined test pattern depends on whether the processor is reading or writing to the memory module and the selected test mode of the BIST.

14. The IC of claim 2 wherein the BIST is programmed to operate in a selected one of a plurality of test modes by the processor.

15. The IC of claim 14 wherein the BIST comprises a pattern generator for generating data information for testing, the pattern generator including:
    a first register for storing a predetermined test pattern;
    a second register for storing a test pattern from the processor; and
    a pattern modification circuit for modifying the predetermined test pattern or test pattern.

16. The IC of claim 15 wherein the pattern modification circuit inverts the test pattern or predefined test pattern.

17. The method of claim 16 wherein, depending the selected test mode of the BIST and processor operation, the pattern modification circuit modifies the test pattern or predefined test pattern.

18. The method of claim 15 wherein, depending the selected test mode of the BIST and processor operation, the pattern modification circuit modifies the test pattern or predefined test pattern.

19. The IC of claim 2 wherein the memory module comprises a plurality of memory modules and wherein the test mode tests the memory modules in parallel.

20. The IC of claim 19 wherein the BIST is programmed to operate in a selected one of a plurality of test modes by the processor.

21. The IC of claim 20 wherein the BIST comprises a pattern generator for generating data information for testing, the pattern generator including:
    a first register for storing a predetermined test pattern;
    a second register for storing a test pattern from the processor; and
    a pattern modification circuit for modifying the predetermined test pattern or test pattern.

22. The IC of claim 21 wherein the pattern modification circuit inverts the test pattern or predefined test pattern.

23. The method of claim 22 wherein, depending the selected test mode of the BIST and processor operation, the pattern modification circuit modifies the test pattern or predefined test pattern.

24. The method of claim 21 wherein, depending the selected test mode of the BIST and processor operation, the pattern modification circuit modifies the test pattern or predefined test pattern.

* * * * *